United States Patent
Becorest et al.

(10) Patent No.: US 9,092,774 B2
(45) Date of Patent: Jul. 28, 2015

(54) AUGMENTED REALITY MESSAGING SYSTEM AND METHOD BASED ON MULTI-FACTOR RECOGNITION

(76) Inventors: William Becorest, San Diego, CA (US); Yongkeng Xiao, San Diego, CA (US)

( * ) Notice: Subject to any disclaimer, the term of this patent is extended or adjusted under 35 U.S.C. 154(b) by 139 days.

(21) Appl. No.: 13/615,597

(22) Filed: Sep. 14, 2012

(65) Prior Publication Data

US 2014/0076965 A1    Mar. 20, 2014

(51) Int. Cl.
| | | |
|---|---|---|
| *G06Q 30/00* | (2012.01) | |
| *G06Q 20/34* | (2012.01) | |
| *G06Q 30/02* | (2012.01) | |
| *H04W 4/00* | (2009.01) | |

(52) U.S. Cl.
CPC .......... *G06Q 20/342* (2013.01); *G06Q 30/0251* (2013.01); *H04W 4/00* (2013.01)

(58) Field of Classification Search
CPC ................... G06Q 30/018; G06K 2007/10504
USPC ........................................................ 235/380
See application file for complete search history.

(56) References Cited

U.S. PATENT DOCUMENTS

| | | | | |
|---|---|---|---|---|
| 7,836,132 | B2 * | 11/2010 | Qureshi et al. ................ | 709/206 |
| 8,606,645 | B1 * | 12/2013 | Applefeld .................... | 705/26.1 |
| 2007/0175998 | A1 * | 8/2007 | Lev ............................... | 235/454 |
| 2011/0055049 | A1 | 3/2011 | Harper et al. | |
| 2011/0201362 | A1 | 8/2011 | Bregman-Amitai et al. | |
| 2012/0022924 | A1 * | 1/2012 | Runnels et al. ............... | 705/14.4 |
| 2012/0181330 | A1 * | 7/2012 | Kim .............................. | 235/375 |
| 2012/0199649 | A1 * | 8/2012 | Wishnatzki et al. .......... | 235/375 |

* cited by examiner

*Primary Examiner* — Thien M Le
*Assistant Examiner* — Toan Ly
(74) *Attorney, Agent, or Firm* — ARC IP Law, PC; Joseph J. Mayo (57) ABSTRACT

Enables creating, displaying, and managing augmented reality (AR) messages linked to objects that display or contain identifiable information such as codes, including card products/prepaid card products, etc. Applies multi-factor recognition technology to process an object/card having a unique code. May utilize an application on a mobile device/computer, to capture an image of the object, recognize the signature of the object, convert the code into alphanumeric digits and generate a Unique Identification Token (UIT). The application can create a personalized AR message, e.g., text, 2D/3D image, freehand drawing, animation, video, audio, avatar character, or any combination, optionally enhanced with pre-made templates. The completed message is stored in a remote database with the UIT. The recipient of the object/card uses the application and captures an image of the object or card image with code, triggering the message experience that may display account balance information and targeted advertising.

20 Claims, 9 Drawing Sheets

AUGMENTED REALITY MESSAGING SYSTEM AND METHOD BASED ON MULTI-FACTOR RECOGNITION

BACKGROUND OF THE INVENTION

1. Field of the Invention

One or more embodiments of the invention are related to the field of augmented reality, messaging and multi-factor recognition for example for use in conjunction with objects that display or contain identifiable codes such as but not limited to cards, card products, identification cards, credit cards, and prepaid card products such as plastic gift cards, digital gift cards, paper gift certificates and stored value products. More particularly, but not by way of limitation, one or more embodiments of the invention enable an augmented reality messaging system and method based on multi-factor recognition for example that may be utilized on any object such as a prepaid card product or any other object that is associated with and/or displays an identifier such as a unique code or unique account code.

2. Description of the Related Art

Objects that include identifiable codes include cards such as identification cards, credit cards and prepaid cards for example. Prepaid card products include plastic gift cards and tokens, paper gift certificates, loyalty cards, and digital representations thereof. Prepaid card products have gained widespread use in the United States and other countries around the world. In 2010, sales of prepaid gift cards totaled $261.2 billion, according to Mercator Advisory Group (Eighth Annual Closed Loop Prepaid Market Assessment). It should be noted that the terms "prepaid" and "stored value" refer to two types of payment tokens. The Federal Reserve System's Payments System Development Committee (PSDC) defines "prepaid" as being "associated with products for which the prefunded value is recorded on a remote database". The term "stored value" is associated with products for which prefunded value is recorded on the payment instrument" via an embedded microprocessor. At the current time, the vast majority of gift cards on the market are of the "prepaid" type. The emergence of prepaid card products has provided consumers with a quick and convenient shopping alternative. For example, a gift buyer may purchase a gift card from a merchant that is valued at a specific dollar amount and present it to a recipient. The recipient may use the gift card to purchase any product or service supplied by the merchant. Prepaid card products are convenient for the giver, and allow the recipient to choose the preferred gift item.

Whether in digital or physical form, known prepaid card products are linked to a remote financial database through the use of an account code. This account code is a unique string that may include both numbers and letters. On physical gift cards, this account code can be encoded onto a magnetic stripe, or a smart card, or represented in barcode format. This format allows the account code to be captured quickly at the point of sale/redemption by swiping or scanning on point of sale (POS) equipment. The account code is also represented in "human readable" format as a failsafe in case the code must be manually keyed into the POS due to equipment or card failure. In addition, the account code must be manually input in the case of web-based redemption.

Prepaid card products are often purchased as gifts for others, for example for events such as birthdays, holidays, special occasions, and incentives. Many methods have been utilized for packaging and distributing the prepaid card product to add presentational value. For example, the buyer may secure a gift card inside a greeting card and package both inside of an envelope. In addition, a variety of specialized paper card carriers, backers, and cardboard containers have been developed to add convenience and visual appeal to the experience of receiving a prepaid card product. These presentation systems provide limited space for handwriting the name of the recipient, as well as the value of the prepaid card product enclosed, a personal message or some type of expression, for example a congratulatory expression. The gift presentation is important since gift cards by themselves, while valued and convenient, are often viewed as somewhat impersonal since they require minimal thought and effort from the giver.

Known presentation systems are limited in the use of digitization and mobile technologies that can enhance and extend the moment of gift discovery. Recent developments in augmented reality have demonstrated some capabilities for coupling digital experiences with inanimate objects. Augmented reality (AR) is a technology that enables pictures, text and video to be overlaid onto a real image and viewed through a mobile device or camera-enabled computer. Augmented reality technology is now enabling a new generation of applications that entertain and provide practical use. Many mobile applications allow the user to engage in augmented reality experiences by pointing their camera-enabled device, such as a mobile phone, at an object that has been marked, tagged, or otherwise printed with an identifying graphic specifically designed to trigger the AR experience. One such system is described in U.S. Patent Application Publication No. 2011/0055049, entitled "Method and System for Creating An Augmented Reality Experience in Connection With a Stored Value Token". Since this system relies upon the pre-printed marker, its use is limited to the distribution of that marker. For example, if a retail chain store, for example "ABC Company" deploys this technology for its prepaid card products, the consumer can only use the technology in association with ABC Company's prepaid card products.

Optical Character Recognition (OCR) is widely used to convert paper-based data, such as documents, books, receipts and printed records, into an editable electronic format. Image recognition is a similar technology that interprets and identifies images by such characteristics as size, shape, color and position. One system that shows a rich media object on a photographic image of an object include U.S. Patent Application Publication Serial No. 2011/0201362, entitled "Augmented Media Message". This system does not meet the specific needs of the prepaid card product. For example, a retail outlet will commonly offer many thousands of gift cards with the same artwork. If two separate individuals, for example an Aunt and an Uncle, happen to each buy a gift card from the same merchant for the same individual, for example a nephew, and attach a message using the photographed object as the trigger, there exists the potential of triggering the wrong media message since there is no use of any unique identifier on each card. Also, using a photographed object as the trigger relies upon the quality of the original photo and the ability of the recipient's mobile device to accurately match the given object to the photographed image. Furthermore, the recipient must receive both the photo and object in order to experience the message. Lastly, the prior art does not relate to online images, such as digital gift cards.

For at least the limitations described above there is a need for an augmented reality messaging system and method based on multi-factor recognition.

BRIEF SUMMARY OF THE INVENTION

One or more embodiments described in the specification are related to an augmented reality messaging system and method based on multi-factor recognition. At least one embodiment of the invention identifies an object having a code, such as a prepaid card product by a human-readable account code and generates a Unique Identification Token (UIT). Since most prepaid card products display a human readable account code, at least one embodiment of the invention provides an AR messaging solution for the majority of gift cards in the marketplace. At least one embodiment of the invention combines the modern technologies of optical recognition and augmented reality to deliver a far richer gift discovery experience by making it possible to link prepaid card products with personalized messages, balance information, and advertising, in an enriched multimedia environment. Embodiments of the invention may be utilized with any object that may have an identifiable code, such as a unique code on an identification card, credit card or debit card, or prepaid card for example. For brevity, exemplary scenarios use a prepaid card to illustrate embodiments of the invention although use of identification cards, credit cards or debit cards or any other objects having an identifier may also be processed or otherwise utilized with or by embodiments of the invention, such as a vehicle having a VIN or vehicle identification number or any other object for example having a bar code.

As opposed to known systems, at least one embodiment of the invention offers a nearly universal solution for prepaid card products from a variety of merchants because it utilizes the identification code, or account code such as the prepaid card account code, which is a ubiquitous feature on prepaid card products. With respect to prepaid cards, the system generally uses the account code to create an AR messaging system that is not limited to any one merchant or corporation. Instead, at least one embodiment of the invention uses a combination of character and image recognition technologies to uniquely identify the prepaid card product and then generate a Unique Identification Token. This component of the system is referred to as the Visual Unique Identification Token (VUIT) Engine. This method enables the system to work on the widest possible range of objects including prepaid card products, and furthermore, does not require the direct integration or collaboration with any merchant. Other objects may include vehicles having a vehicle identification number or any product with a serial number for example, which may be associated in any manner with a particular recipient, i.e., via an account code associated with giving of a gift, etc.

At least one embodiment of the invention bypasses complications of known systems since the system does not require the sending of a photographic image or email in order for the recipient to activate the associated message. At least one embodiment of the invention essentially converts the object into a Unique Identification Token, and is therefore not subject to visual complications related to poor lighting, a change in the appearance of the object, or other factors that could be problematic for a photographic-based triggering method. Embodiments of the invention apply to online digital cards as well as physical forms of prepaid cards. Since at least one embodiment of the method for triggering the experience is based on the identifier or code, or account code, it is more reliable, more accurate, and specifically suited for use with cards having an identifier or code or account code, such as is utilized in the prepaid card industry.

One or more embodiments of the invention utilize or couple with a remote server configured to store an augmented reality-based personalized message and an application that executes on a computer associated with a recipient that receives the object having an identifier, such as a prepaid card product. Use of the term computer herein generally signifies that the application that executes on the computer determines the manner in which the computer is specifically programmed to perform the tasks of the system. The application that executes on the computer associated with the recipient is generally configured to communicate with the remote server and is configured to identify an account code and visual characteristics associated with the object, e.g., prepaid card product and produce an originator signature or issuer signature for an originator or issuer of the object. This generally occurs after the recipient receives the object from a giver of the object. Although the giver of the object or card may utilize the main components of the system and same process to generate a personalized message, there is no requirement to do so. In other words, the giver of the card may or may not utilize the same or different application to generate and display the personalize message. Any method that enables a giver of a prepaid card product to create a unique personalized message to a recipient is in keeping with the spirit of the invention. The computer also is configured to generate a unique identification token for the object, e.g., prepaid card product using the account code and the issuer signature and retrieve the augmented reality-based personalized message from the remote server based on the unique identification token. The augmented reality-based personalized message may also be created automatically in one or more embodiments by an entity such as a corporation to promote unique products and/or to aid a giver in the creation of a personalized message for example. The computer is also configured generally to display the augmented reality-based personalized message on the computer associated with the recipient and may also display the message on the computer associated with a giver if desired. In one or more embodiments the computer that presents or otherwise displays the augmented reality-based personalized message may be a mobile computer, or may be any other type of computer that the recipient may access for example, including a 3D television or any other type of display device.

Embodiments of the system may employ a computer that is further configured to identify the identifier or account code and visual characteristics using any known technology or algorithms in keeping with the spirit of the invention. For example, one embodiment of the computer is configured to identify the account code and signature for the issuer via a capture of an image of the prepaid card product and the account code. The computer than may apply image recognition to identify visual elements within the image, and map location coordinates of the elements. The computer may also extract the account code from the image and determine relative location coordinates of the account code on the prepaid card product and apply character recognition on the account code to recognize the account code of the prepaid card product. The computer may then also extract any background elements from the image, wherein the background element include any combination of one or more logo, graphical or text elements on the prepaid card product, into a collection of background objects with relative location coordinates respectively and extract the visual characteristics from the collection of background objects and the relative location coordinates to produce the issuer signature of the prepaid card product. This process may also be utilized by the computer associated with the giver of the card for embodiments that enable mobile device personalized message generation for the giver for example.

The system may also create the augmented reality-based personalized message for example automatically or with any input from any person as accepted by the system or in any other manner and associate the augmented reality-based personalized message with the unique identification token. One or more embodiment may also access an available balance or account information that is linked to the object or prepaid card product from the originator or issuer and create the augmented reality-based personalized message that includes the available balance or account information and associate the augmented reality-based personalized message with the unique identification token. For example, embodiments may show a monetary message in numerical form, pie graph form, or in any other manner or show number of traffic tickets, current fees due for automobile registration, club points, frequent flyer miles available or any other quantity associated with an account for example.

Embodiments of the system may also map the issuer signature to a computer associated with the issuer and send an available balance request or account information request to the computer associated with the originator or issuer based on the identifier or account code of the object or prepaid card product and retrieve the available balance or account information that is linked to the object or prepaid card product.

One or more embodiments may be configured to create a viewing receipt request and link the viewing receipt request to the unique identification token in the remote server and change the viewing receipt request to a viewed state in the remote server after the personalized message is viewed by the recipient and send notification to the giver to indicate the recipient viewed the personalized message. Alternatively or in combination, one or more embodiment of the invention may be configured to receive a thank you message from the recipient and link the thank you message to the unique identification token in the remote server and send the thank you message to the giver.

One or more embodiments of the invention may differentiate any object or prepaid card product issued by a first originator or issuer from any object or prepaid card product issued by a second originator or issuer that differs from the first originator issuer and may also differentiate any object or prepaid card product from any other object or prepaid card products that originate from or are issued by the same originator or issuer for example.

One or more embodiments may also combine the identifier or account code and the signature to uniquely identify the object or prepaid card product and store the unique identification token in the remote server. Embodiments of the computer associated with the giver may also accept input to create the augmented reality-based personalized message that includes any combination of one or more text message, freehand picture, voice clip, 2D image, 3D image, prerecorded audio or video, live audio or video, 2D or 3D animated character and animated character voice. Other embodiments may allow a picture of a card obtained in any manner with input of this type or any other type to enable non-mobile devices to create personalized messages from the giver, for example using personal computer, website applications, televisions or any other type of display.

One or more embodiments of the method may implement the functionality of the system in a variety of hardware configurations, as one skilled in the art will appreciate. For example, embodiments of the method may include identifying an identifier or account code and visual characteristics associated with an object or prepaid card product and producing an originator signature or an issuer signature for an originator or issuer of the object or prepaid card product using a computer associated with a recipient of the object or prepaid card product after receiving the object or prepaid card product from a giver of the object or prepaid card product. Embodiments of the method may also include generating a unique identification token for the object or prepaid card product using the identifier or account code and the originator signature or issuer signature and retrieving an augmented reality-based personalized message from a remote server based on the unique identification token and displaying the augmented reality-based personalized message on the computer associated with the recipient.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An augmented reality messaging system and method based on multi-factor recognition will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
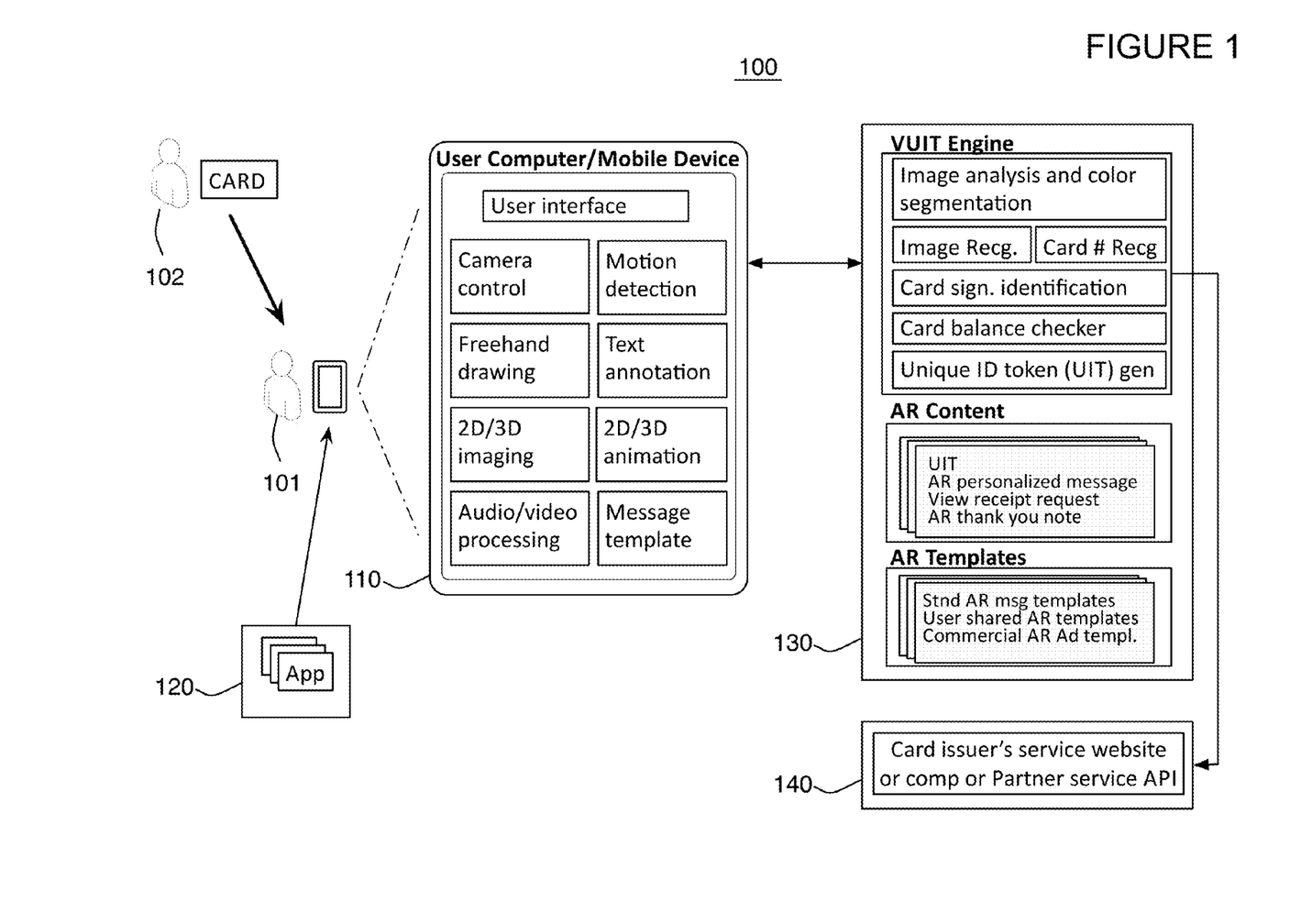
FIG. 1 shows a block diagram of an embodiment of the augmented reality messaging system and method based on multi-factor recognition.

FIG. 1 shows a block diagram of an embodiment of the augmented reality messaging system and method based on multi-factor recognition. One or more embodiments of in the invention 100 utilize or couple with remote server 130 configured to store an augmented reality-based personalized message and an application that executes at least one computer 110 associated with recipient 101 that receives the object having an identifier, such as a prepaid card product, shown as box "CARD", from giver 102. The application may for example be purchased from an online application marketplace such as app market 120. The card issuer's computer or website 140 may also interface with the system to provide details for example regarding prepaid amount or any other data associated with the card. The application, or a different application may be utilized to create the personalized message by a giver of the prepaid card product.

Although the embodiments detailed below are illustrated generally with respect to prepaid card products, any object having an identifier may be utilized with embodiments of the system wherein the identifier identifies the specific instance of the object, for example via an account code or other identifier. The object may be an identification card, credit or debit card or prepaid card for example. Embodiments of the invention may also utilize any other object that is not card based, for example that includes a serial number or other identifier that may be associated with a recipient, for example a gift code. In addition, the originator of the object may include a manufacturer or issuer of the object, or generally any other entity associated with the object in other embodiments. For brevity, the remainder of the specification will generally utilize the exemplary prepaid card product terminology although one skilled in the art will recognize that other objects may be utilized in a parallel manner for example.

The application that executes on computer 110 associated with recipient 101 is generally configured to communicate with remote server 130, for example wirelessly, and is configured to identify an account code and visual characteristics associated with the prepaid card product and produce an issuer signature for an issuer of the prepaid card product. Any RFID chip, electronic chip, magnetic strip or any other identifying information may also be utilized to obtain an account code and issuer signature in keeping with the spirit of the invention. The identification of the account code and visual characteristics generally occurs after recipient receives 101 the prepaid card product from giver 102. The prepaid card product may be sent physically or electronically in one or more embodiments. In the case of a physical card, the camera on computer 110 or coupled therewith may be utilized in the identification for example. Computer 110, or alternatively remote server 130, may be configured to generate a unique identification token for the prepaid card product using the account code and the issuer signature. Computer 110 may request that remote server 130 retrieve the augmented reality-based personalized message based on the unique identification token. Computer 110 is also configured generally to display the augmented reality-based personalized message on computer 110 associated with the recipient. In one or more embodiments this is a mobile computer, but may be any computer that the recipient may access for example, including devices having 3D displays or any other type of visual or audio display. Embodiments of computer 110 may include a user interface including a 2D or 3D interface, camera, motion detector, freehand drawing, text annotation, 2D/3D imaging and animation, audio/visual processing and messaging template modules. These modules enable optional input and display of augmented reality-based personalized messages.

Embodiments of the system may employ computer 110 and/or remote server 130 that is further configured to identify the account code and visual characteristics using any known technology or algorithms in keeping with the spirit of the invention. For example, one embodiment of the computer is configured to identify the account code and signature for the issuer via a capture of an image of the prepaid card product and the account code. The computer than may apply image recognition to identify visual elements within the image, and map location coordinates of the elements. The computer may also extract the account code from the image and determine relative location coordinates of the account code on the prepaid card product and apply character recognition on the account code to recognize the account code of the prepaid card product. The computer may then also extract any background elements from the image, wherein the background element include any combination of one or more logo, graphical or text elements on the prepaid card product, into a collection of background objects with relative location coordinates respectively and extract the visual characteristics from the collection of background objects and the relative location coordinates to produce the issuer signature of the prepaid card product. The image analysis and color segmentation, image recognition, card number recognition, card signature identification, card balance checker and unique identification token or UIT generator are shown as components or modules of the VUIT Engine in remote server 130. Any algorithms may be utilized for these modules as long as the modules can recognize the elements and generate a unique identification token. Although shown as executing on remote server 130, any of these modules may execute on computer 110 if powerful enough, or on any other computer that the system may communicate with, including any peer-to-peer computing elements for example.

The system may also create the augmented reality-based personalized message for example automatically or with any input from any person or entity as accepted by the system or in any other manner and associate the augmented reality-based personalized message with the unique identification token. One or more embodiment may also access an available balance that is linked to the prepaid card product from the issuer and create the augmented reality-based personalized message that includes the available balance and associate the augmented reality-based personalized message with the unique identification token, for example as obtained from issuer computer or website 140.

Embodiments of the system may also map the issuer signature to a computer 140 associated with the issuer and send an available balance request to the computer associated with the issuer based on the account code of the prepaid card product and retrieve the available balance that is linked to the prepaid card product.

One or more embodiments may be configured to create a viewing receipt request and link the viewing receipt request to the unique identification token in the remote server and change the viewing receipt request to a viewed state in the remote server after the personalized message is viewed by the recipient and send notification to the giver to indicate the recipient viewed the personalized message. Alternatively or in combination, one or more embodiment of the invention may be configured to receive a thank you message from the recipient and link the thank you message to the unique identification token in the remote server and send the thank you message to the giver. The Unique Identification Token or UIT, along with the AR personalized message, view receipt request and AR thank you note or any subset thereof may be stored in the AR Content database or server as shown. Alternatively or in combination, these objects may be stored in any other component of the system or in any other location accessible by components of the system as shown in keeping with the spirit of the invention. In addition, templates for use in the generation of standard AR messages and user shared AR templates along with any commercial AR advertising templates may also be stored in the AR template database or server as shown or in any other location accessible by the VUIT Engine of remote server 130.

One or more embodiments of the invention may differentiate any prepaid card product issued by a first issuer from any prepaid card product issued by a second issuer that differs from the first issuer and may also differentiate any prepaid card product from any other prepaid card products issued by the same issuer for example.

One or more embodiments may also combine the prepaid card product account code and the signature to uniquely identify the prepaid card product and store the unique identification token in the remote server.

One or more embodiments of the method may implement the functionality of the system in a variety of hardware configurations, as one skilled in the art will appreciate. For example, embodiments of the method may include identifying an account code and visual characteristics associated with a prepaid card product and producing an issuer signature for an issuer of the prepaid card product using a computer associated with a recipient of the prepaid card product after receiving the prepaid card product from a giver of the prepaid card product. Embodiments of the method may also include generating a unique identification token for the prepaid card product using the account code and the issuer signature and retrieving an augmented reality-based personalized message from a remote server based on the unique identification token and displaying the augmented reality-based personalized message on the computer associated with the recipient.

Figure 2:
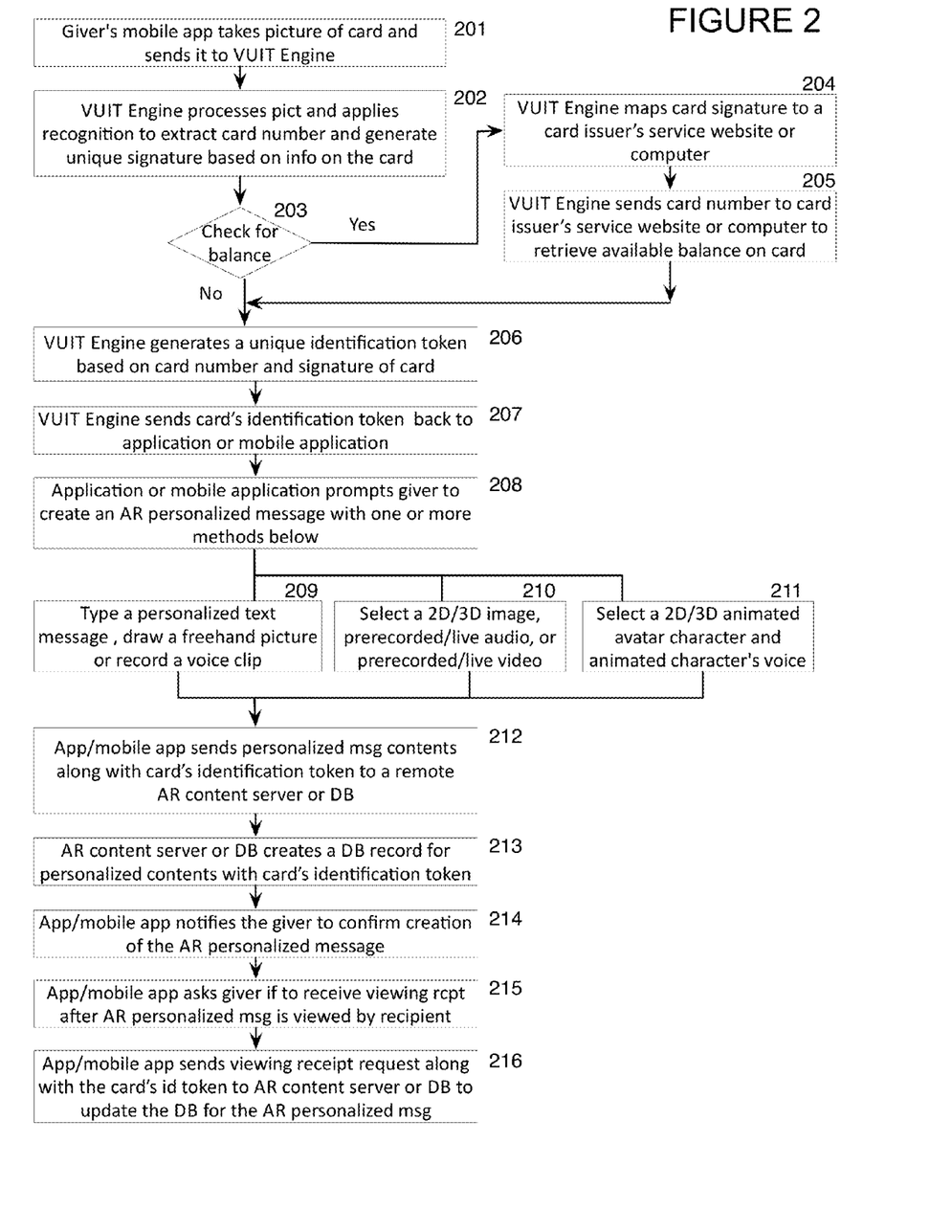
FIG. 2 shows a flow chart of an embodiment of a method of creating an augmented reality-based personalized message.

FIG. 2 shows a flow chart of an embodiment of a method of creating an augmented reality-based personalized message. In this embodiment, a giver utilizes a mobile application to take a picture of the prepaid card product such as a card at 201 and send the picture to the remote server. The VUIT Engine on the remote server processes the picture and applies any image processing algorithms and recognizes the card number and generates a unique signature based on the information on the card at 202. If the balance of the card is to be utilized as determined at 203, then the VUIT Engine maps the unique signature, or card signature to the website or computer associated with the issuer of the card at 204 and thus obtains a location to request further information. The VUIT Engine sends the card number and retrieves the available balance on the card, or for example any other information such as advertisements, or other information at 205. The VUIT Engine generates a unique identification token based on the card number and unique signature at 206. The VUIT Engine sends the unique identification token back to the application at 207, for example running on a computer associated with the giver, which is not shown for brevity. The application or mobile application prompts the giver to create an AR personalized message at 208 with one or several methods, shown as 209, 210 or 211 or any combination thereof. For example, the giver may type in a personalized text message, draw a freehand picture or record an audio clip at 209. The giver may select a 2D or 3D image, prerecorded or live audio or video at 210. The giver may select a 2D or 3D animated avatar and animated character voice at 211. The application or mobile application sends the personalized message contents along with the unique identification token of the card to the remote AR content database or server at 212. The AR content database or server creates a database record for the personalized contents associated with the unique identification token at 212. The application or mobile application notifies the giver to confirm creation of the personalized message at 214. The application or mobile application asks the giver if the giver desires to receive a viewing receipt after the AR personalized message is viewed by the recipient at 215. The application or mobile application sends the viewing receipt request along with the unique identification token to the AR content database or server to update the database record for the AR personalized message at 216.

Figure 3:
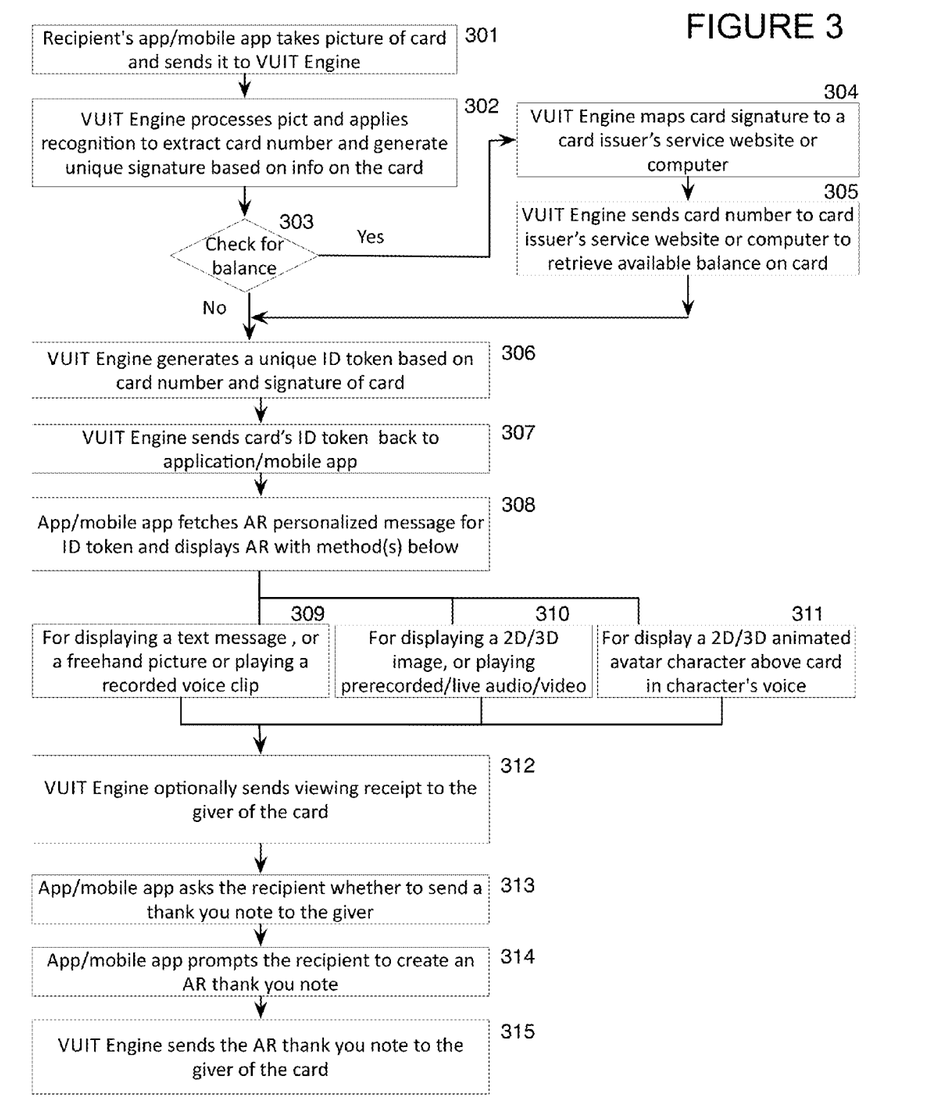
FIG. 3 shows a flow chart of an embodiment of a method of viewing an augmented reality-based personalized message.

FIG. 3 shows a flow chart of an embodiment of a method of viewing an augmented reality-based personalized message. The application or mobile application of the computer associated with the recipient takes a picture or otherwise receives an image of the card, or electronically sent card at 301 and sends the picture of the card to the VUIT Engine. The VUIT Engine processes the picture and application image recognition to extract the card number and generate a unique signature based on the information on the card at 302.

If the balance of the card is to be utilized as determined at 303, then the VUIT Engine maps the unique signature, or card signature to the website or computer associated with the issuer of the card at 304 and thus obtains a location to request further information. The VUIT Engine sends the card number and retrieves the available balance on the card, or for example any other information such as advertisements, or other information at 305. The VUIT Engine generates a unique identification token based on the card number and unique signature at 306. The VUIT Engine sends the unique identification token back to the application at 307, for example running on computer 110 associated with the recipient. The application or mobile application fetches the AR personalized message at 308 and displays the message with one or several methods, shown as 309, 310 or 311 or any combination thereof. For example, computer 110 may display a personalized text message, a freehand picture or play an audio clip at 309, display a 2D or 3D image, play prerecorded or live audio or video at 310, or display a 2D or 3D animated avatar with animated character voice at 311. The VUIT Engine may optionally send the viewing receipt to the giver of the card at 312. The application or mobile application on computer 110 may optionally ask the recipient whether to send a thank you note at 313 and if so asks the recipient to create the AR thank you note at 314 and sends the AR thank you note to the giver at 315.

Figure 4:
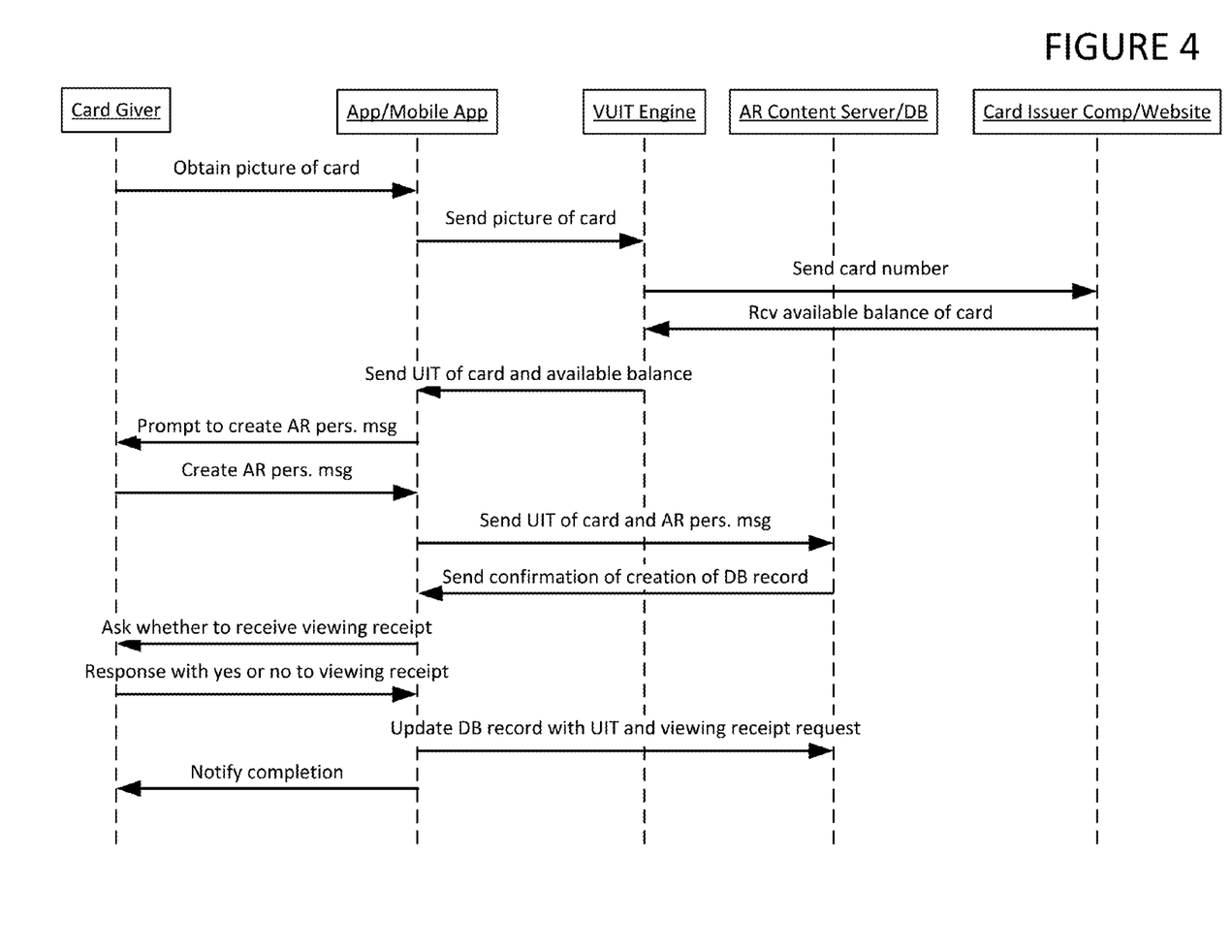
FIG. 4 shows exemplary interactions of creating an augmented reality-based personalized message according to at least one embodiment of the invention.

FIG. 4 shows exemplary interactions of creating an augmented reality-based personalized message according to at least one embodiment of the invention. As shown, the application or mobile application associated with the giver obtains a picture from the card and sends the picture to the VUIT Engine. In one or more embodiments with high computational capable mobile devices, any of the processing described herein may be performed on the mobile device for example. The card number may be sent by the VUIT Engine to the computer or website of the card issuer and the available balance returned. The UIT and optional available balance is returned to the application or mobile application and the card giver may then be prompted to create a personalized AR message at which time the application or mobile application accepts user input and creates the personalized AR message and sends the UIT of the card and the personalized AR message to the AR content database or server and receives confirmation thereof. The application or mobile application asks the giver whether to receive a viewing receipt when the recipient views the message and receives the response of yes or no. The application or mobile application updates the database with the UIT and viewing receipt request and notifies the giver of completion thereafter.

Figure 5:
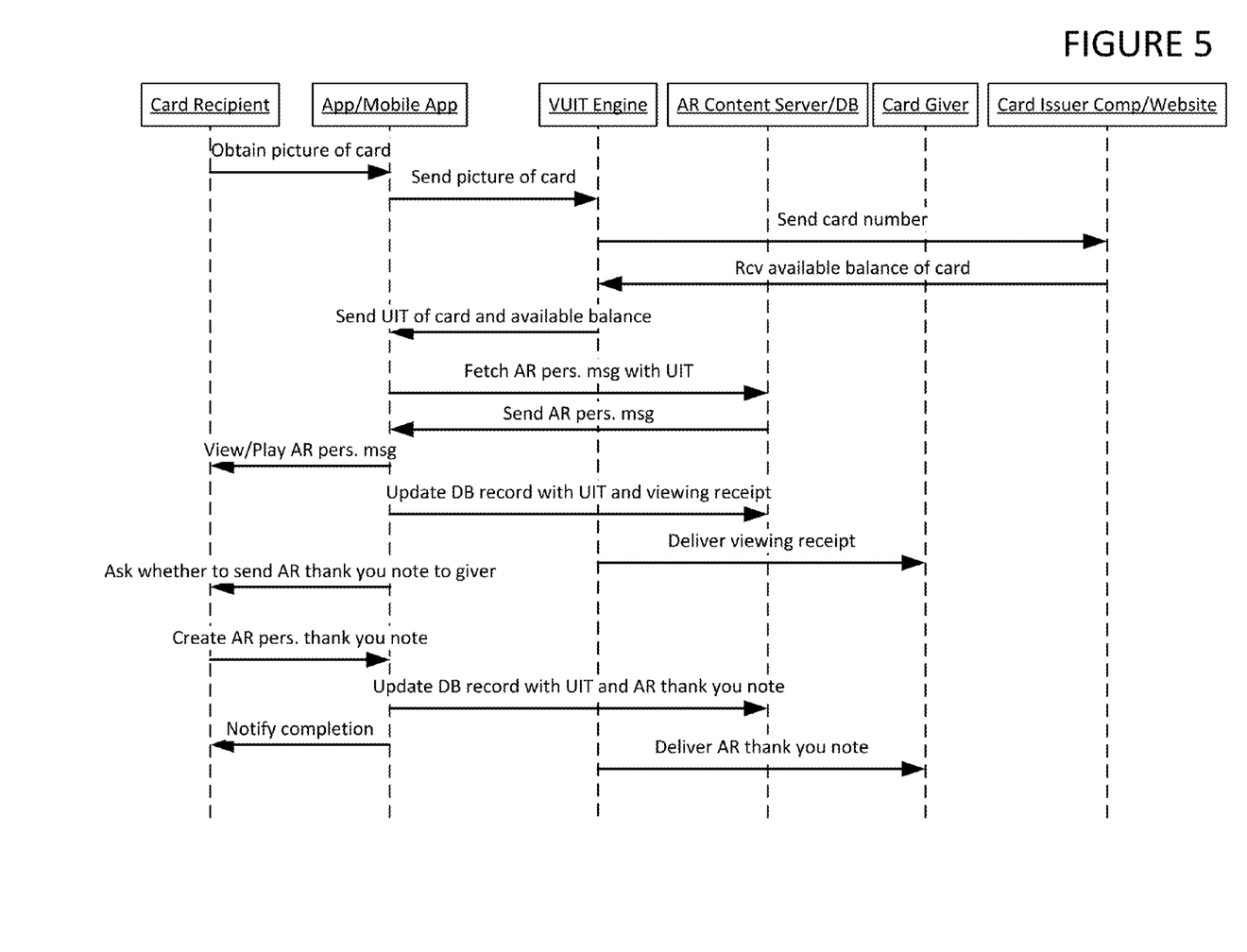
FIG. 5 shows exemplary interactions of viewing an augmented reality-based personalized message according to at least one embodiment of the invention.

FIG. 5 shows exemplary interactions of viewing an augmented reality-based personalized message according to at least one embodiment of the invention.

As shown, the application or mobile application associated with the recipient obtains a picture from the card and sends the picture to the VUIT Engine. In one or more embodiments with high computational capable mobile devices, any of the processing described herein may be performed on the mobile device for example. The card number may be sent by the VUIT Engine to the computer or website of the card issuer and the available balance returned.

The personalized AR message is fetched and sent back by the AR content database or server and the personalized AR message is viewed and/or played by the application or mobile application. The application or mobile application updates the viewing status. The VUIT Engine delivers the viewing receipt to the giver. The application or mobile application asks the recipient whether to create an AR thank you note. If so, the application or mobile application obtains an AR personalized thank you note, for example using the same tools used to create the personalize AR message by the giver and the AR thank you note is stored in the AR content database or server. The VUIT Engine delivers the AR thank you note to the giver and notifies the recipient of completion thereafter.

Figure 6:
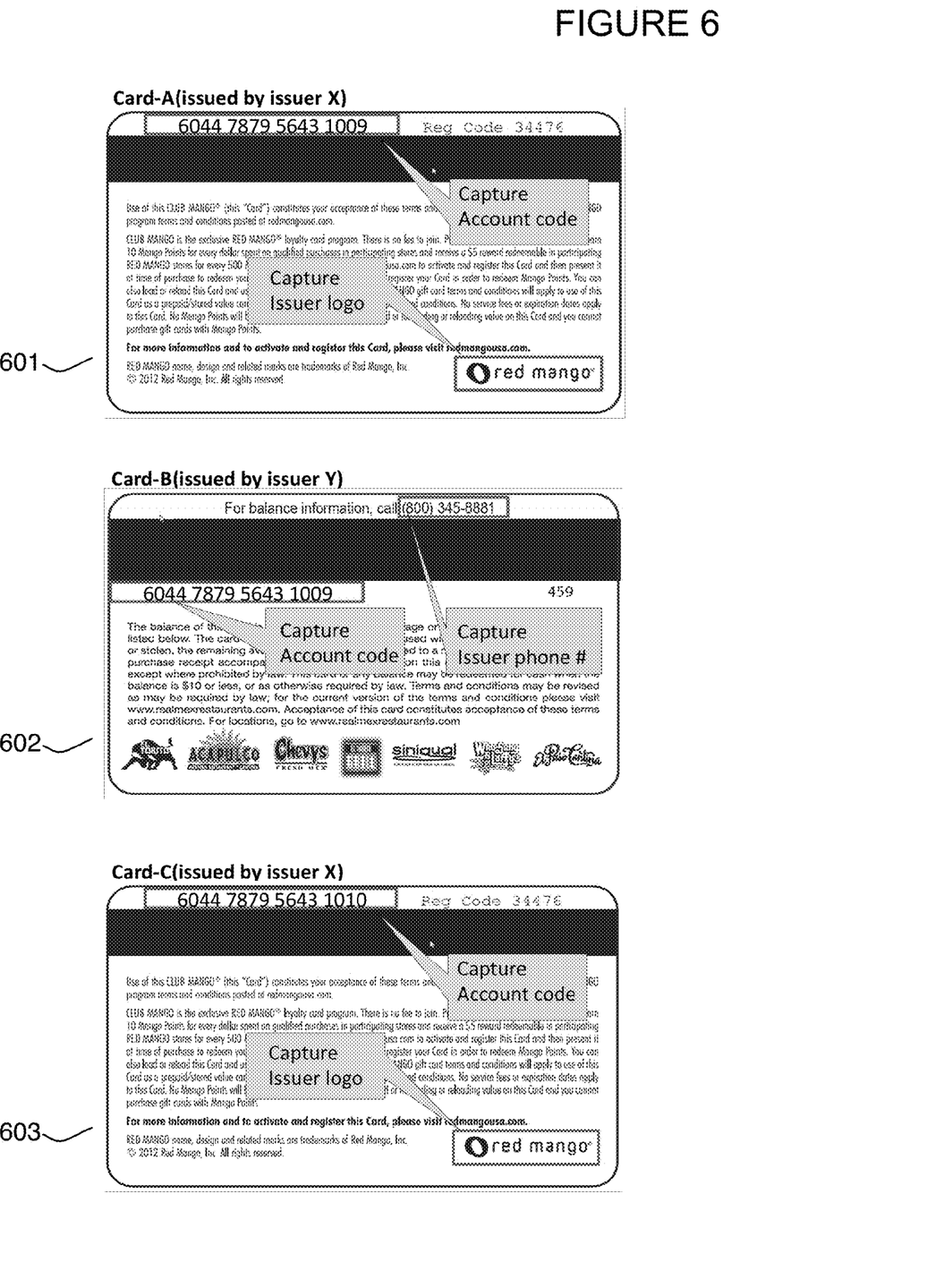
FIG. 6 shows an illustrative example of identifying a gift card and generating a unique identification token according to at least one embodiment of the invention.

FIG. 6 shows an illustrative example of identifying a gift card and generating a unique identification token according to at least one embodiment of the invention. As shown cards 601, 602 and 603 are issued by issuer X, Y and X respectively. Cards 601 and 602 for example are from different merchants, but coincidentally use the same account code. The VUIT Engine captures the account codes as well as the logo images or other background elements and uses this information to recognize that these are two different cards. For example card 601 may have a logo that is utilized to identify the card, while card 602 may have a phone number that is utilized to identify the card. The VUIT Engine then generates a unique identification token for each card based on the account number and identifying information. This eliminates the possibility of erroneous delivery of a personalize AR message. Cards 601 and 603 are from the same merchant. The visual elements on the cards may be the same, but the account codes are different. The VUIT Engine captures the account codes and recognizes that the two cards have different account code and generates a unique identification token for each card. The VUIT Engine may utilize the signature of the card, i.e., the unique combination of account number and identifying information to request account balance from the card issuer's website or other computer and display that information in a personalize AR message for example on the recipient's mobile device as controlled by the mobile application executing on the computer of the mobile device.

Figure 7:
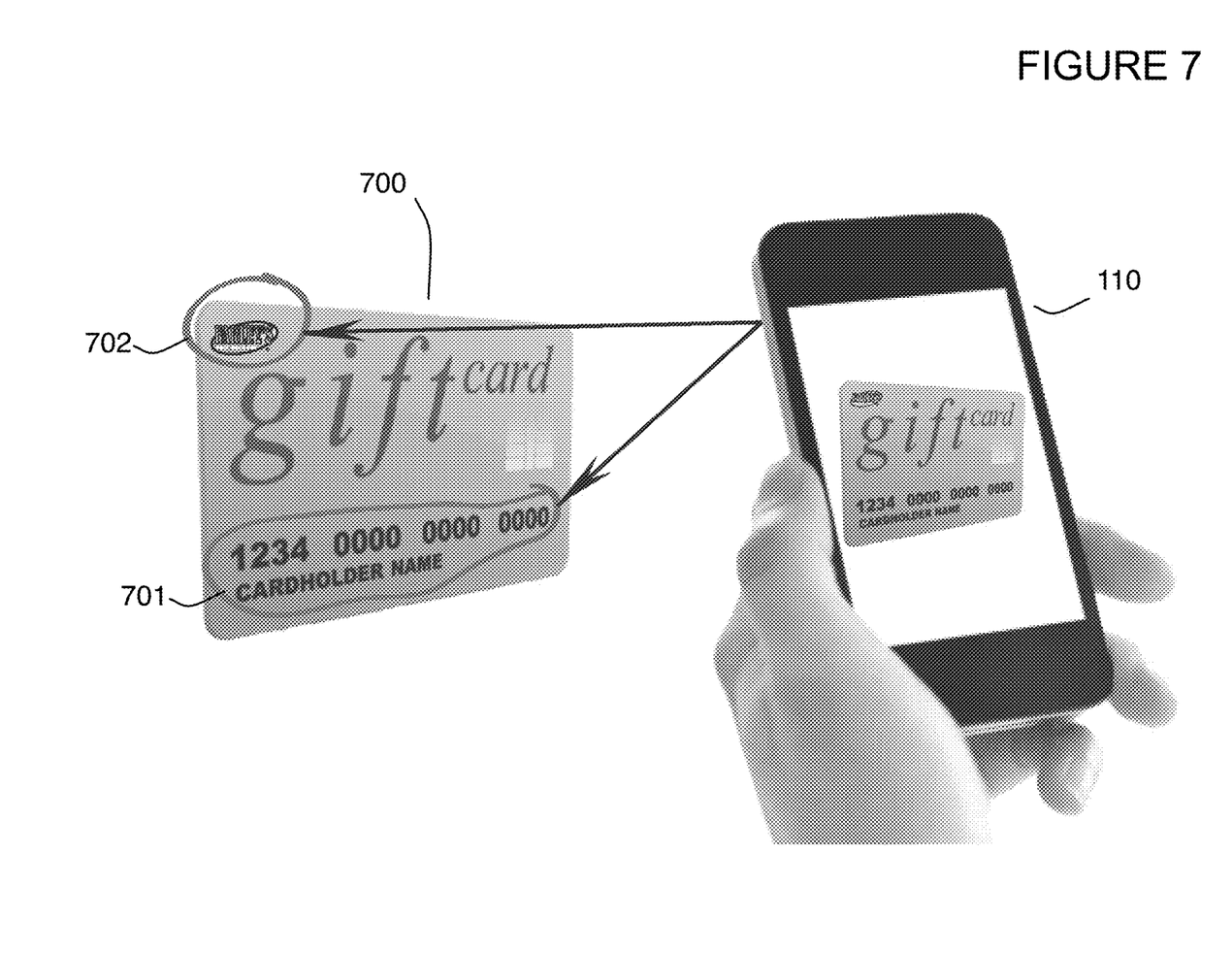
FIG. 7 shows an example mobile application on a mobile device configured to capture an image of the object or card having an identifier.

FIG. 7 shows an example mobile application on a mobile device configured to capture an image of object or card 700 having identifier 701 and originator signature 702 for example. As shown, mobile device 110 equipped with a camera may be utilized to capture an image of the object wherein the image is sent to the remote server for processing, or alternatively based on the processing power of the mobile device is processed locally.

Figure 8:
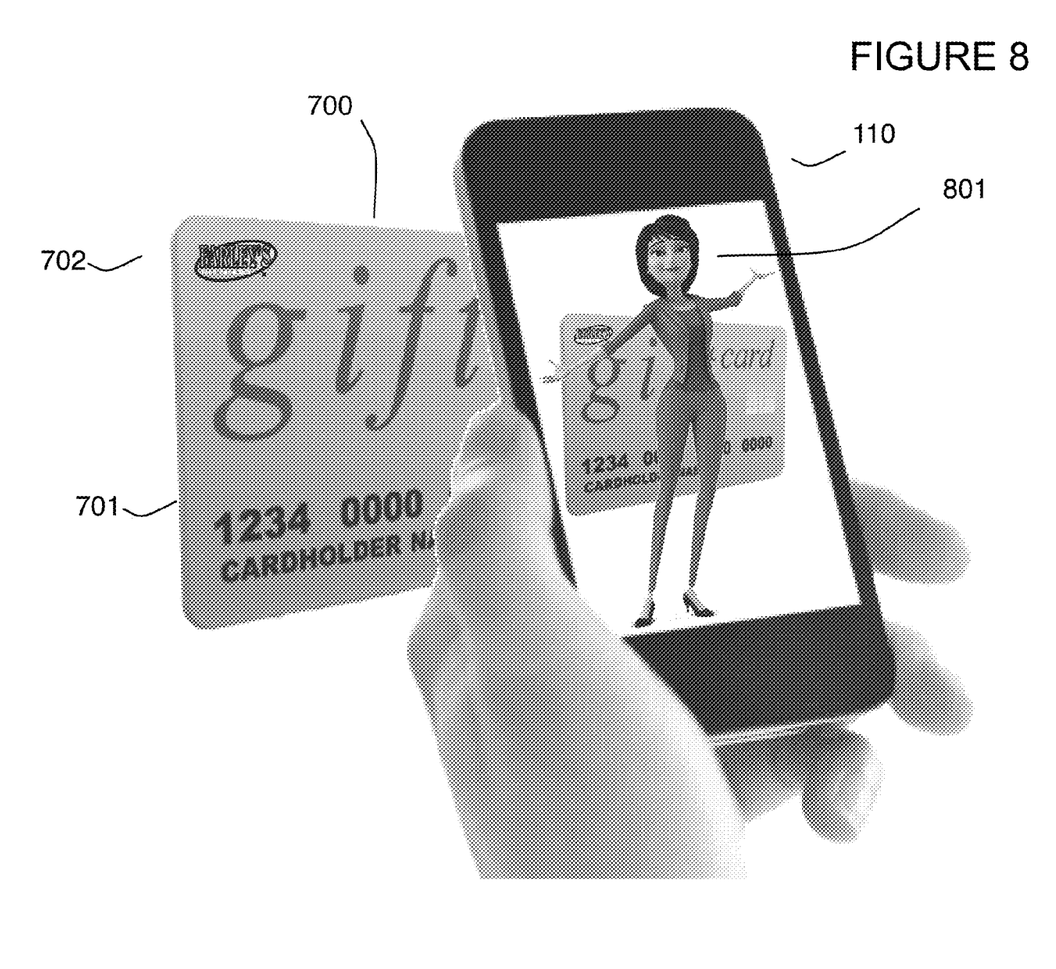
FIG. 8 shows an example of an augmented reality character displayed on the mobile device as the mobile device is directed at the card.

FIG. 8 shows an example of augmented reality character 801 displayed on the mobile device as the mobile device is directed at the card. In one or more embodiments, as the image on the screen of the mobile device is displayed, it is continuously updated as the object moves in front of the mobile device, for example while the augmented reality message remains in spatial association with the object. In one or more embodiments, this means that the augmented reality character is effectively hovering over, locked on, or otherwise visually associated with the object. In one or more embodiments, to view the augmented reality personalized message, the mobile device is oriented toward the object wherein the message appears on the object while the object is visible on the screen of the mobile device.

Figure 9:
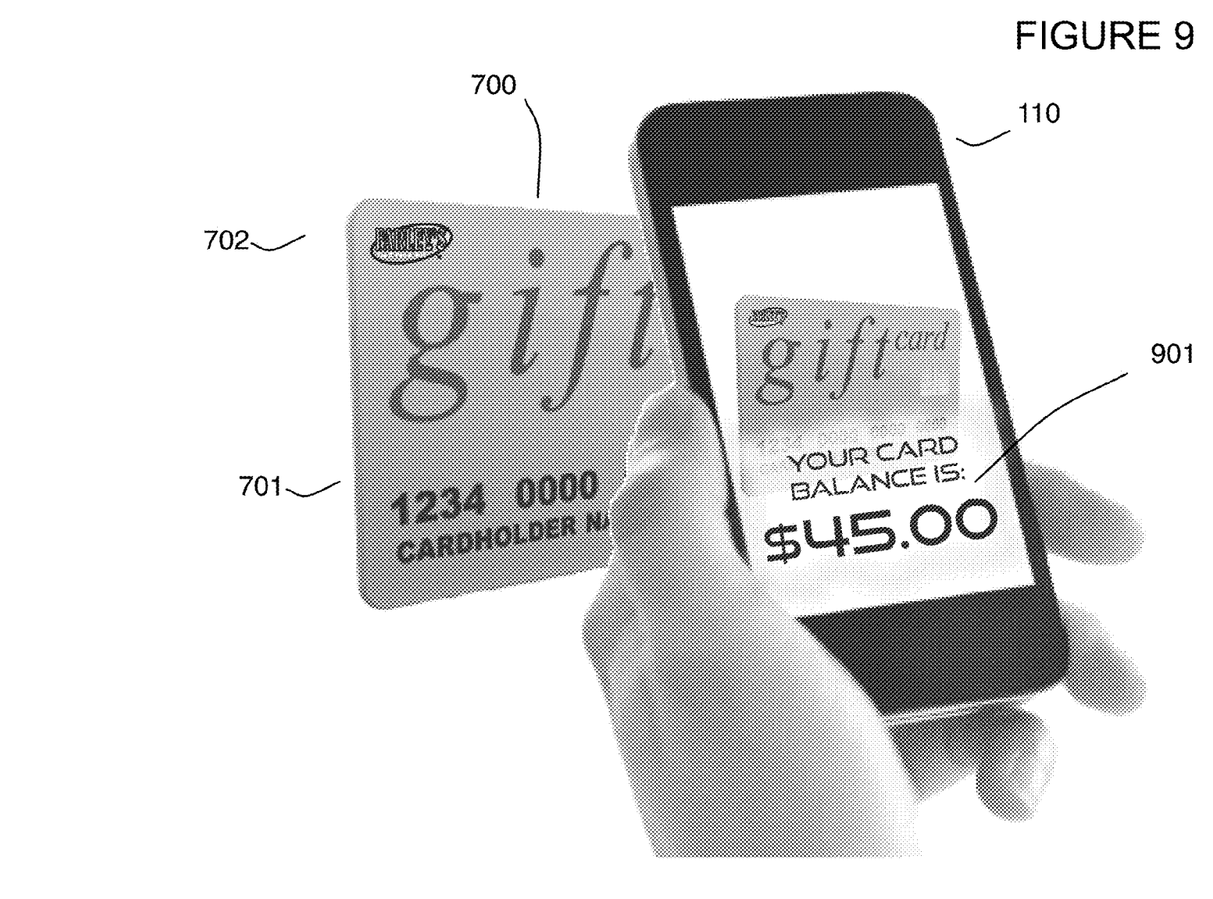
FIG. 9 shows an example of an account balance displayed on the mobile device as the mobile device is directed at the card.

FIG. 9 shows an example of account balance 901 displayed on the mobile device as the mobile device is directed at the card. As shown, the numerical account balance is displayed that is for example associated with the identifier or account code and originator of the card, e.g., a particular gift card from a merchant. Any other information associated with a recipient or associated identifier or account may also be displayed in any graphical, text, image, video, 2D or 3D format with optional audio for example.

While the invention herein disclosed has been described by means of specific embodiments and applications thereof, numerous modifications and variations could be made thereto by those skilled in the art without departing from the scope of the invention set forth in the claims.

What is claimed is:

1. An augmented reality messaging system based on multi-factor recognition comprising:
   a remote server configured to store an augmented reality-based personalized message;
   an application configured to execute on a computer configured to communicate with said remote server, wherein said computer is associated with a recipient of an object having an identifier, and wherein said application that executes on said computer is configured to
   capture an image of said object and said identifier;
   apply image recognition to identify visual characteristics within said image, and map location coordinates of said visual characteristics;
   extract said identifier from said image and determine relative location coordinates relative to said object, of said identifier on said object;
   apply character recognition on said identifier of said object to identify the identifier;
   extract any background elements from said image, wherein said background elements comprise any combination of one or more of color, logo, graphical and text elements on said object, into a collection of background objects with relative location coordinates relative to said object respectively;
   extract said visual characteristics from said collection of background objects and said relative location coordinates relative to said object to
   produce an originator signature for an originator of said object after said recipient receives said object from a giver of said object;
   generate a unique identification token for said object based on said identifier and said originator signature;
   retrieve said augmented reality-based personalized message from said remote server based on said unique identification token; and
   display said augmented reality-based personalized message on said computer associated with said recipient.

2. The system according to claim 1, wherein said identifier is an account code associated with said object.

3. The system according to claim 1, wherein said object is a prepaid card product, identification card or credit card or debit card and said identifier is an account code associated with said object.

4. The system according to claim 1, wherein said computer is further configured to:
   create said augmented reality-based personalized message and associate said augmented reality-based personalized message with said unique identification token.

5. The system according to claim 1, wherein said computer is further configured to:
   access an available balance or account information that is linked to said object from said originator; and,
   create said augmented reality-based personalized message that includes said available balance or account information and associate said augmented reality-based personalized message with said unique identification token.

6. The system according to claim 5, wherein said computer is further configured to:
map said originator signature to a computer associated with said originator;
send an available balance or account information request to said computer associated with said originator based on said identifier of said object; and,
retrieve said available balance or account information that is linked to said object.

7. The system according to claim 1, wherein said computer is further configured to:
create a viewing receipt request and link said viewing receipt request to said unique identification token in said remote server;
change said viewing receipt request to a viewed state in said remote server after said augmented reality-based personalized message is viewed by said recipient;
send notification to said giver to indicate said recipient viewed said augmented reality-based personalized message.

8. The system according to claim 1, wherein said computer is further configured to:
receive a thank you message from said recipient and link said thank you message to said unique identification token in said remote server; and,
send said thank you message to said giver.

9. The system according to claim 1, wherein said computer is further configured to:
differentiate any object issued by a first originator from any object issued by a second originator that differs from said first originator; and,
differentiate any object from any other objects issued by one of either said first originator or said second originator.

10. The system according to claim 1, further comprising:
an application configured to execute on a second computer configured to communicate with said remote server wherein said second computer is associated with said giver of said object and wherein said application that executes on said second computer is configured to
accept input to create said augmented reality-based personalized message that includes any combination of one or more of a text message, freehand picture, voice clip, 2D image, 3D image, prerecorded audio or video, live audio or video, 2D or 3D animated character and animated character voice;
combine said object identifier and said originator signature to uniquely identify said object; and,
store said unique identification token in said remote server along with said input to create said augmented reality-based personalized message.

11. An augmented reality messaging method based on multi-factor recognition comprising:
capturing an image of said object and said identifier;
applying image recognition to identify visual characteristics within said image, and mapping location coordinates of said visual characteristics;
extracting said identifier from said image and determining relative location coordinates relative to said object, of said identifier on said object;
applying character recognition on said identifier of said object and
identifying the identifier;
extracting any background elements from said image, wherein said background elements comprise any combination of one or more of color, logo, graphical and text elements on said object, into a collection of background objects with relative location coordinates relative to said object respectively;
extracting said visual characteristics from said collection of background objects and said relative location coordinates relative to said object and producing an originator signature for an originator of said object using an application that executes on a computer associated with a recipient of said object after receiving said object from a giver of said object;
generating a unique identification token for said object using said identifier and said originator signature;
retrieving an augmented reality-based personalized message from a remote server based on said unique identification token; and,
displaying said augmented reality-based personalized message on said computer associated with said recipient.

12. The method according to claim 11, wherein said identifier is an account code associated with said object.

13. The method according to claim 11, wherein said object is a prepaid card product, identification card or credit card or debit card and said identifier is an account code associated with said object.

14. The method according to claim 11, further comprising:
creating said augmented reality-based personalized message and associating said augmented reality-based personalized message with said unique identification token.

15. The method according to claim 11, further comprising:
accessing an available balance or account information that is linked to said object from said originator; and,
creating said augmented reality-based personalized message that includes said available balance or account information and associating said augmented reality-based personalized message with said unique identification token.

16. The method according to claim 15, wherein said accessing the available balance comprises:
mapping said originator signature to a computer associated with said originator;
sending an available balance or account information request to said computer associated with said originator using said identifier of said object; and,
retrieving said available balance or account information that is linked to said object.

17. The method according to claim 11, further comprising:
creating a viewing receipt request and linking said viewing receipt request to said unique identification token in said remote server;
changing said viewing receipt request to a viewed state in said remote server after said augmented reality-based personalized message is viewed by said recipient; and,
sending notification to said giver to indicate said recipient viewed said augmented reality-based personalized message.

18. The method according to claim 11, further comprising:
receiving a thank you message from said recipient and linking said thank you message to said unique identification token in said remote server; and,
sending said thank you message to said giver.

19. The method according to claim 11, further comprising:
differentiating any object issued by a first originator from any object issued by a second originator that differs from said first originator; and, differentiating any object from any other objects issued by one of either said first originator or said second originator.

20. The method according to claim 11, wherein said generating said unique identification token comprises:
    accepting input to create said augmented reality-based personalized message that includes any combination of one or more of a text message, freehand picture, voice clip, 2D image, 3D image, prerecorded audio or video, live audio or video, 2D or 3D animated character and animated character voice;
    combining said identifier and said originator signature to uniquely identify said object; and,
    storing said unique identification token in said remote server along with said input to create said augmented reality-based personalized message.

* * * * *